United States Patent [19]

Harshberger

[11] 3,912,126
[45] Oct. 14, 1975

[54] SNAP-ON MEASURING DISPENSER FOR COFFEE CONTAINERS AND THE LIKE
[75] Inventor: Russell P. Harshberger, Pasadena, Calif.
[73] Assignee: Donald Bohler, Sierra Madre, Calif.
[22] Filed: Mar. 4, 1974
[21] Appl. No.: 447,557

[52] U.S. Cl. ............................................... 222/307
[51] Int. Cl.² .......................................... G01F 11/22
[58] Field of Search .......... 222/434, 435, 438, 439, 222/452, 556, 363, 368, 307, 305

[56] References Cited
UNITED STATES PATENTS

| 2,702,656 | 2/1955 | Bates | 222/307 |
| 2,785,831 | 3/1957 | Smolin | 222/305 X |
| 2,859,900 | 11/1958 | Kiyuna | 222/434 X |
| 3,029,002 | 4/1962 | Gregoire | 222/307 |
| 3,122,278 | 2/1964 | Crozier | 222/305 |
| 3,169,668 | 2/1965 | Ziegler | 222/307 X |
| 3,199,734 | 8/1965 | Hvistendahl | 222/452 X |

Primary Examiner—Stanley H. Tollberg
Assistant Examiner—Norman L. Stack, Jr.

[57] ABSTRACT

A snap-on closure for coffee containers and the like embodying a measuring dispenser readily adjustable to dispense one of several different quantities of coffee and effective to maintain the container closed in an airtight manner whether the dispenser is in charging or discharging position.

4 Claims, 5 Drawing Figures

SNAP-ON MEASURING DISPENSER FOR COFFEE CONTAINERS AND THE LIKE

This invention relates to container closure devices, and more particularly to an improved snap-on closure embodying a measuring dispenser preventing the entrance of air into or the escape of volatiles from the container in all operating positions of the dispenser.

Certain comestibles are sold in standard size metal containers with the contents vacuum sealed or sealed with a charge of an inert gas to prevent or retard aging and prolong the shelf life of the contents. Ground coffee is a typical example of a foodstuff commonly packaged and sold in this manner. It is also common conventional practice to provide a plastic cover having a press fit over the end of the container after its sealed end has been removed by a can opener. Such a closure is fairly effective in excluding air and preventing the escape of volatiles from the contents so long as closed but each time a portion of the contents is required it is necessary to remove the sealing cap with the result that fresh air enters as other air carrying volatiles escapes. It is also desirable to provide some convenient and inexpensive device for measuring quantities of the container contents. Various expedients for this purpose have been proposed heretofore including measuring rotary dispensers. However, such dispensers, though capable of measuring a desired quantity of material with reasonable accuracy, fail to include means for maintaining the container sealed at all times, or means for readily and easily varying the quantity dispensed, or means for mounting the dispenser over the end of the container simply and in a reliable fluid-tight manner.

This invention avoids these shortcomings and disadvantages of the prior art in a highly effective, reliable and economical manner. The invention snap-on cover and measuring dispenser has a main body molded from supple, elastomeric material having a press fit over the end of a container immediately following removal of its sealing cap. The midportion of the device includes a fluid-tight measuring dispenser likewise molded from elastomeric material so designed and constructed as to maintain its charging inlet sealed against the entrance of outside air and against the escape of volatiles from within the container in all operating positions irrespective of whether the dispenser is in closed or open position. The operating handle and dispenser rotor are adjustable to different axial positions, the handle being seatable in one of several notches of different depths to vary the quantity of material dispensed during any operating cycle.

Accordingly, it is a primary object of the present invention to provide a simple, snap-on closure for a standard container having a press fit over the open end of the container and including a measuring dispenser effective to maintain the interior sealed in all operating positions of the dispenser.

Another object of the invention is the provision of a measuring dispenser for a container having a rotor so assembled to a seating surface as to be resiliently biased against its seating surface in all operating positions.

Another object of the invention is the provision of a combined air-tight closure and measuring dispenser usable on the open end of coffee and the like containers and selectively operable to dispense one of several different quantities of the container contents while maintaining the interior of the container sealed from the atmosphere.

These and other more specific objects will appear upon reading the following specification and claims and upon considering in connection therewith the attached drawing to which they relate.

Referring now to the drawing in which a preferred embodiment of the invention is illustrated:

Figure 1:
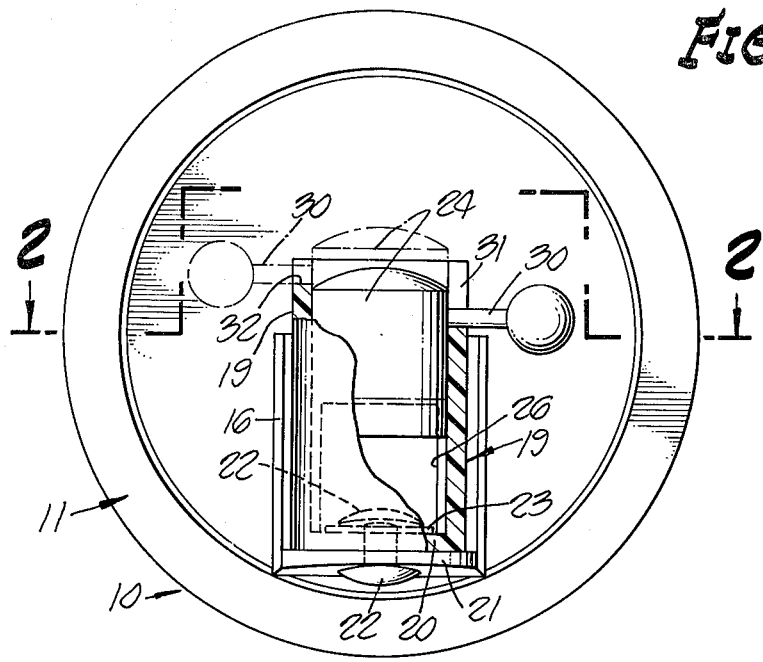
FIG. 1 is a plan view from the exterior of the invention dispenser with portions broken away to show constructional details.
Figure 2:
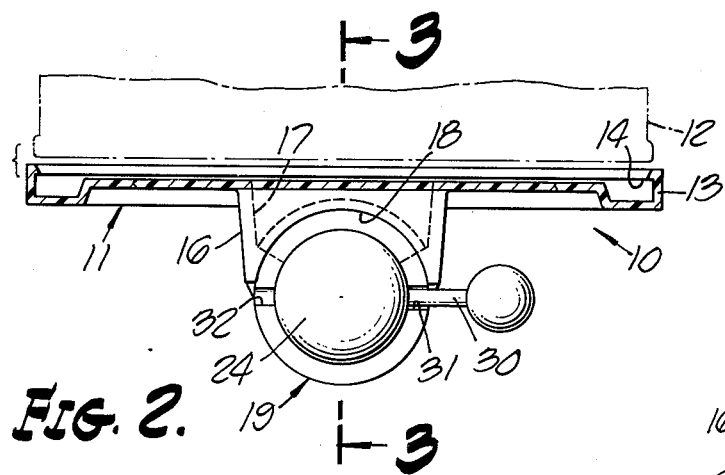
FIG. 2 is a cross-sectional view taken along line 2—2 on FIG. 1 and showing the dispenser in position to be assembled to the lower end of an upright container.
Figure 3:
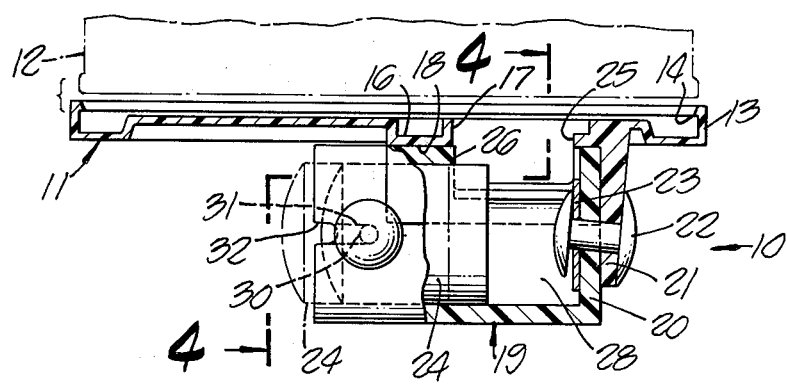
FIG. 3 is a fragmentary cross-sectional view taken along line 3—3 on FIG. 2.

Referring initially more particularly to FIGS. 1–3, there is shown an illustrative embodiment of a combined closure and dispensing device embodying the principles of the present invention, and designated generally 10. This device has a disc-like main body 11 molded from soft, supple plastic material and sized suitably for a press snap-on fit over the end of a conventional sealed metal container 12. It will be understood that this container typically is of the type employed to vacuum pack coffee and other comestibles and the opposite ends of which are secured to the container body by a rolled rim which projects slightly beyond the exterior surface of the container sidewall. Such containers often come equipped with a plastic cover assembled to one end for subsequent use to cover the open end after the latter has been removed by a conventional can opener. Device 10 of this invention is applied to the can in lieu of such covers. For this purpose, the outer rim of main body 11 has a low-height annular flange 13 projecting axially and including an inturned retainer lip 14 sized to have a fluid-tight snap-on forced fit over the rolled rim of container 12, thereby to form a fluid-tight seal with the container.

Molded integral with the mid-portion of main body 11 is a hollow boss 16. This boss has a generally rectangular passage 17 opening into the interior of the container and a semi-cylindrical seating surface 18 crosswise of its outer end having a close rotary fit with the exterior of the hollow cylindrical dispenser rotor 19. The closed right hand endwall 20 of rotor 19 is held against the flat wall 21 of boss 16 by a rivet or the like assembly fastener 22.

An important feature of this fastener is that its axis lies at a small angle, such as 4 to 8 degrees to the axis of rotor 19 and seating surface 18 for this rotor. Thus the axis of the rivet is normal to the exterior surface of wall 21 with the result that the plastic material between those portions of the rivet washers 23,23 above the rivet axis as viewed in FIG. 3 is under continuous compressive pressure. Accordingly, this compressive pressure is effective to urge rotor 19 to pivot clockwise about the center of the rivet as viewed in FIG. 3 thereby to hold the rotor fimrly seated against seating surface 18 in all positions of the rotor. This important operating advantage is achieved by the simple expedient of mounting the assembly rivet at a small angle to the rotor axis so as to place a selected area of the rotor end wall and the adjacent end wall 21 of boss 16 under constant compression in a manner effective to bias the rotor continuously against seating surface 18.

The left hand end of rotor 19, as viewed in FIG. 3, is closed by a plug 24 having a snug fit with the interior sidewall of the rotor but can be shifted axially along the interior of the rotor for purposes which will be described presently.

Figure 4:
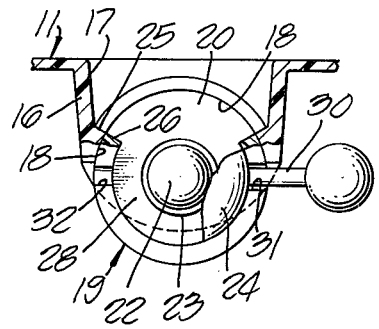
FIG. 4 is a cross-sectional view taken along the broken line 4—4 on FIG. 3 and showing the dispenser rotor rotated to a filling positions.

The cylindrical seat 18 of boss 16 is provided with a large area port 25 through which the container contents pass to fill the interior of the measuring rotor 19. Material can flow through port 25 when a similar size and shaped port 26 in the sidewall of rotor 19 is rotated into registry therewith as it is in FIG. 4. At that time the space 28 (FIG. 3) between the inner end of plug 24 and endwall 20 of rotor 19 can fill completely with the container contents. This measured quantity of material can be dispensed through port 26 when rotor 19 is rotated 180° to the position shown in FIG. 5. At that time the sidewall of the rotor diametrically opposite port 26 fully closes the charging port 25.

Rotor 19, as herein shown, is provided with an operating handle 30 projecting radially from plug 24 near its outer end. Handle 30 is normally seated in one of the notches 31,32 formed axially of the diametrically opposed sides of rotor 19 as is best shown in FIG. 3. These notches are of different depths and it will be recognized that plug 24 can be shifted axially of the rotor until handle 30 is seated at the inner end of either of these notches. Thus, it will be understood that the size of measuring chamber 28 varies depending on which notch is occupied by handle 30, the rotor having its maximum measuring capacity when handle 30 is seated in notch 32 and the least when it is seated in notch 31.

Figure 5:
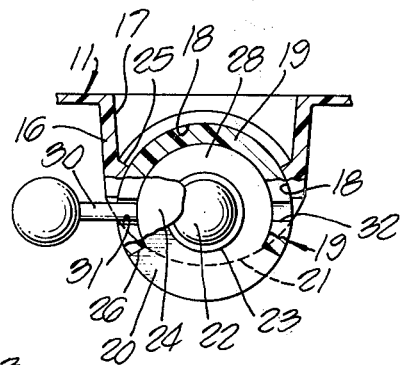
FIG. 5 is a cross-sectional view similar to FIG. 4 but showing the dispenser rotor in its alternate or discharge position.

Normally, the dispensing rotor is left in the closed position shown in FIG. 5. To measure a quantity of coffee or other material, the user first rotates handle 30 one half revolution to the position shown in FIG. 4. As this is done the measuring space 28 quickly fills with material from the container with the result that the handle can be quickly reversed and returned to its starting position shown in FIG. 5. During this return movement the material begins discharging through port 26 into the receiving receptacle and the contents are fully dispensed as or before the handle reaches its starting position. Throughout this operation no air can enter the container nor can volatile constituents within the container escape.

While the particular snap-on measuring dispenser for coffee containers and the like herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A combined snap-on closure and measuring dispenser for a container comprising: a disc-like main body of supple molded plastic material, the periphery of said main body having an annular axially-projecting threadless flange provided with a thin flexible inturned lip sized to have a forced air-tight snap assembly fit over the conventional out-turned rim edge of a metal container designed to hold a molded plastic cover in place thereon, the midportion of said main body having a hollow boss projecting outwardly therefrom on the opposite side thereof from said annular flange, said hollow boss having a semi-cylindrical seating surface closed at one end and open at the other end thereof, a hollow measuring rotor closed at one end and having a cylindrical exterior surface having a snug rotary fit against said semi-cylindrical seating surface with its closed end seated snugly against the interior face of the closed end of said semi-cylindrical seating surface, fastener means holding said rotor rotatably assembled to the closed end of said hollow boss, said rotor having an opening in the sidewall thereof registerable with an outlet opening through said cylindrical surface when said rotor is rotated into the charging position thereof, and said rotor being rotatable after receiving a charge through one half a revolution to the dispensing portion thereof, one end of said rotor being provided with a cylindrical closure plug having a snug fit with the juxtaposed interior sidewall of said rotor, and means including an operating handle for said rotor to hold said plug adjusted in a selected one of several different positions axially of said rotor whereby said dispenser can be adjusted to dispense a preselected one of several quantities of material from a container during an operating cycle of said rotor, and said one rotor end being provided with a series of axial notches of different depths, and said operating handle extending outwardly from said plug and being seatable at the inner end of a selected one of said notches thereby to position said plug appropriately for said rotor to dispense a desired measured quantity of material from a container to which said dispenser is attached.

2. A snap-on dispenser as defined in claim 1 characterized in that said notches open laterally into one another whereby said plug is readily shiftable to a different operating position by shifting said plug and handle axially outwardly along said rotor and then rotating the plug until the handle is in alignment with another selected notch and seating the edge of the handle firmly at the inner end of the selected notch.

3. A snap-on dispenser as defined in claim 1 characterized in that the axis of said fastener means is inclined at a small angle to the rotor axis and lies in a plane normal to the plane of said closure with the end of the axis remote from said fastener means closest to the plane of said closure, whereby said fastener means is effective to bias said rotor continuously toward said seating surface.

4. A snap-on dispenser as defined in claim 1 characterized in that said fastener means is effective to compress a portion of the rotor end wall located on the portion thereof closest to said closure and thereby urge said rotor continuously into seating engagement with said seating surface in all operating positions of said rotor.

* * * * *